May 7, 1957

N. A. DIMMOCK 2,791,089

JET PIPE AND JET DEFLECTING NOZZLE DEVICE
FOR A JET-PROPELLED AIRCRAFT

Filed April 28, 1954

Inventor
Norman Albert Dimmock
By
Stevens, Davis, Miller & Mosher
Attorneys

May 7, 1957  N. A. DIMMOCK  2,791,089
JET PIPE AND JET DEFLECTING NOZZLE DEVICE
FOR A JET-PROPELLED AIRCRAFT
Filed April 28, 1954  3 Sheets-Sheet 2

Inventor
Norman Albert Dimmock
By
Stevens, Davis, Miller & Mosher
Attorney

May 7, 1957 N. A. DIMMOCK 2,791,089
JET PIPE AND JET DEFLECTING NOZZLE DEVICE
FOR A JET-PROPELLED AIRCRAFT
Filed April 28, 1954 3 Sheets-Sheet 3
Fig. 5
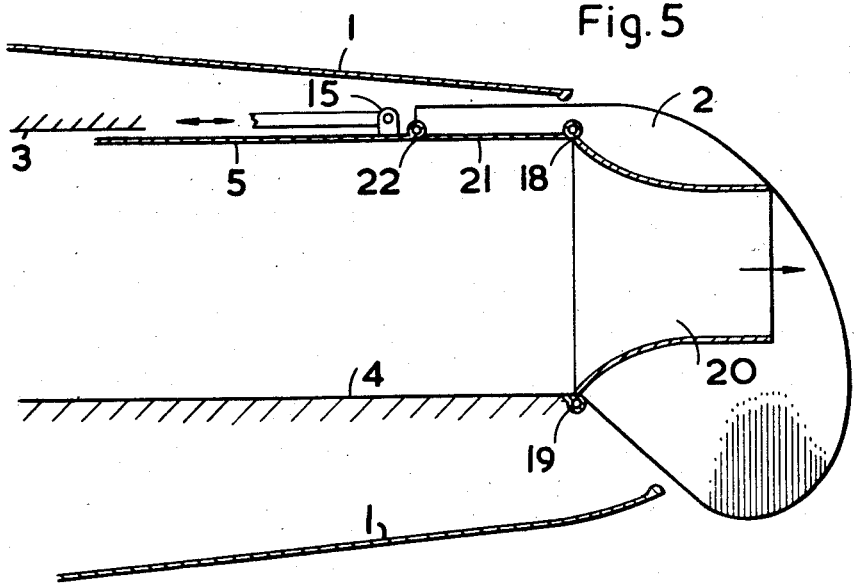
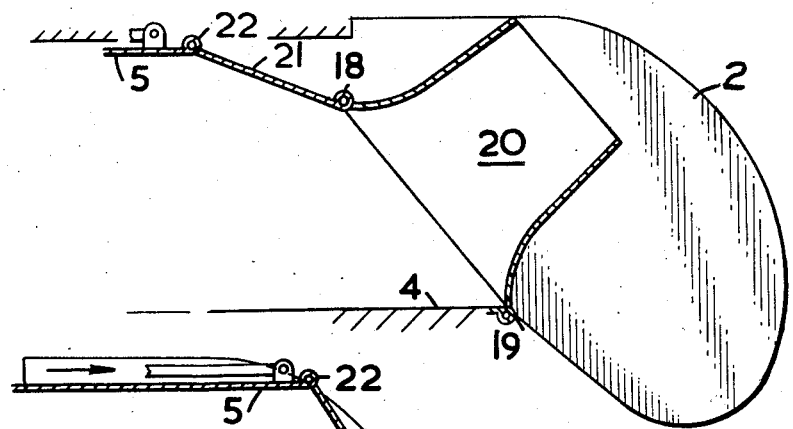
Fig. 6
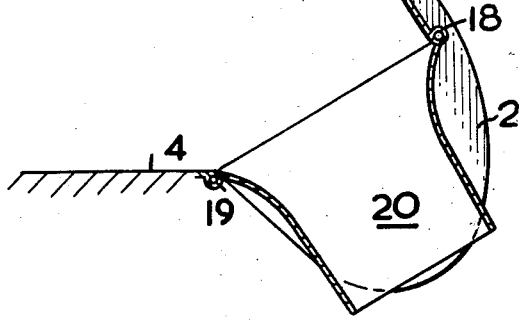
Fig. 7
Inventor
Norman Albert Dimmock
By
Stevens, Davis, Miller & Mosher
his Attorneys

United States Patent Office 2,791,089
Patented May 7, 1957

2,791,089

JET PIPE AND JET DEFLECTING NOZZLE DEVICE FOR A JET-PROPELLED AIRCRAFT

Norman Albert Dimmock, Woking, England, assignor to Power Jets (Research and Development) Limited, London, England, a British company Application April 28, 1954, Serial No. 426,229

Claims priority, application Great Britain May 6, 1953

6 Claims. (Cl. 60—35.55)

In order to divert the propulsive jet of a jet propelled aircraft from a rearward direction to a downwardly or upwardly inclined direction, upper and lower walls defining a rectangular or trapezoidal nozzle from which the jet issues may be hinged for movement up and down. The present invention is concerned with a device of this kind operable by acting on one of the said walls to turn it about a hinge, the other wall making a corresponding movement about the same or another hinge so that the gap between the ends of these walls, and hence the nozzle outlet area, is determined for all positions of the walls.

According to the invention one nozzle wall is hinged to the rear end of one wall of the jet pipe while the opposite nozzle wall is hingedly connected to a slider movable forward and rearward along the opposite wall of the jet pipe, and a connection linking the two nozzle walls constrains them to make corresponding angular movements. The device can be operated by an actuator connected to the slider.

The invention is particularly applicable to a jet nozzle located within the trailing part of an aircraft wing and adapted to emit a jet in the form of a long shallow sheet from the trailing edge of the wing. Such an application of the invention and a modification thereof, are shown in the accompanying drawings, whereof:

Figure 1:
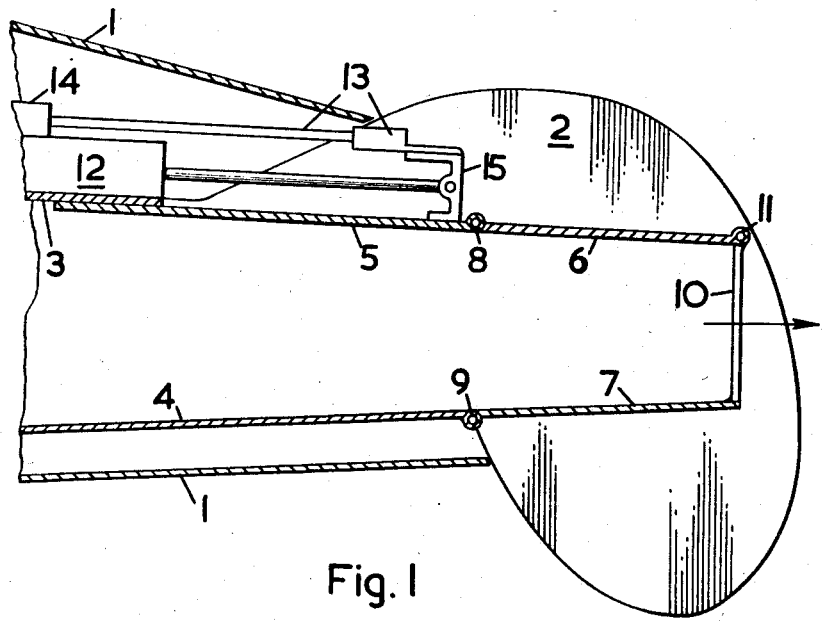
Figure 1 is an axial section through the nozzle, in position for emitting a rearwardly directed jet.
Figure 3:
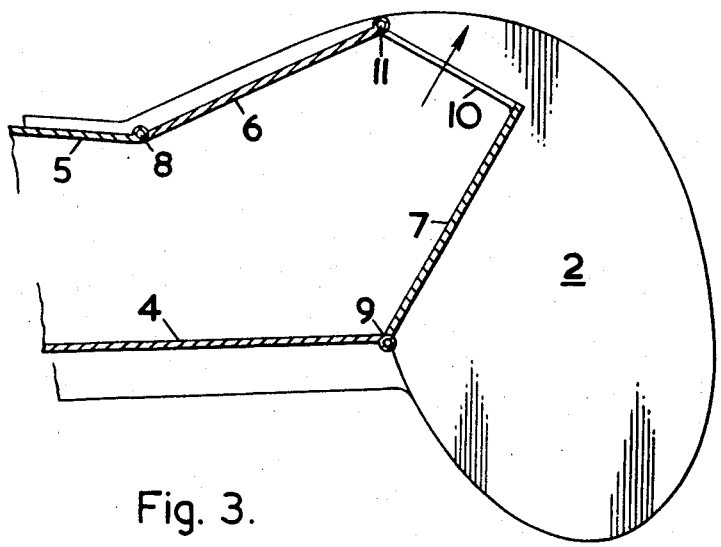
Figure 4:
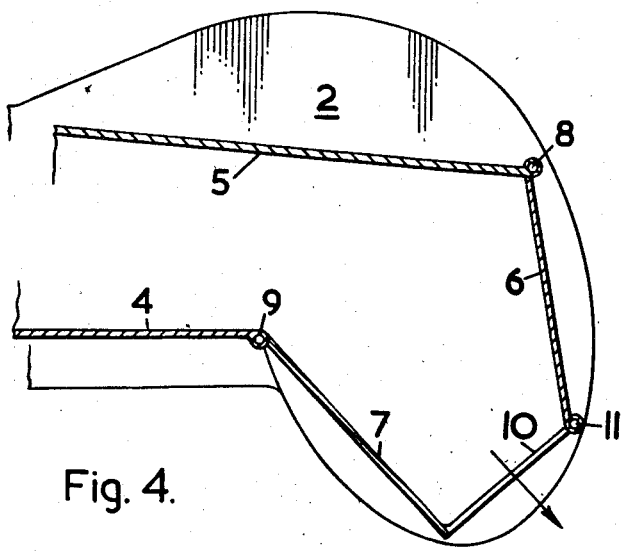

Figures 3 and 4 are views showing the nozzle in position for emitting an upwardly inclined and a downwardly inclined jet respectively; and Figures 5, 6 and 7 are views corresponding to Figures 1, 3 and 4 respectively of the modification.

In Figures 1–4 the aircraft wing 1 houses the jet pipe having side plates 2, an upper wall 3 and a lower wall 4. The latter has an extension plate forming the lower wall 7 of a converging nozzle. This extension is attached to wall 4 by hinge 9 so that it can swing up and down about an axis extending along the rear end of wall 4. The upper wall 3 of the jet pipe is shorter than the lower wall 4, terminating at some distance forward thereof; it carried an extension which consists of a slider plate 5 which can slide along the wall 3, and a plate 6 attached to the slider 5 by hinge 8 so that it can swing up and down about an axis along the rear end of the slider, and constituting the upper wall of the nozzle. Hinged walls 6 and 7 are of equal length. Tying the two hinged walls together are the links 10, each having its ends connected by hinges 11 to the upper wall 6 and by rigid attachment to the lower wall 7 at points at or near to the rear ends thereof. Alternatively but not preferably the linkage is between operating levers fixed to the pivot pins for the nozzle walls 6 and 7 and so moving therewith. A hydraulic or other fluid-operated reciprocating actuator 12 can move the carrier 13 which slides along the guides 14 mounted in the wing and by means of bracket 15 carries the slider 5.

When the hinge 8 lies directly above hinge 9 as in Figure 1, walls 6 and 7 together with side walls 16 and 17 define a rearwardly directed nozzle. If by means of actuator 12 the slider 5 be moved rearwardly the nozzle walls 6 and 7 will both swing downward, as shown in Figure 4, the links 10 keeping them a fixed distance apart at the mouth of the nozzle or in the neighbourhood of the mouth. If the slider be moved forwardly, walls 6 and 7 will swing upward together, as in Figure 3. The actuator 12 thus serves to move both the upper and the lower nozzle wall.

To prevent gas leakage, the various parts slide with sealing engagement.

It will be understood that the whole arrangement described could alternatively be arranged upside down, wall 4 being the upper and wall 3 the lower wall of the jet pipe, slider 5 and actuator 12 being below.

In the modification shown in Figure 5 the wing 1 houses the jet pipe having walls 2, 3 and 4, with slider plate 5 and bracket 15 as already set forth. Attached by hinge 19 to the lower wall 4 of the jet pipe is a complete rectangular-section convergent nozzle unit 20 made up of a top plate, a bottom plate and two side plates with any necessary stiffening webs. This nozzle unit is hinged so that it can swing up and down about an axis forming the junction of its lower forward edge with the wall 4. Attached to the top forward end of the nozzle unit 20 by hinge 18 is the link plate 21 attached at its forward end by hinge 22 to the slider 5. The latter, which is slidable by an actuator as set forth with reference to Figure 1, can act by pulling or pushing through the link 21, to turn the nozzle unit 20 about the hinge 19 to tilt the nozzle upwards as in Figure 6 or downwards as in Figure 7. The maximum possible angular movement of the nozzle unit depends upon the length (between hinges 18 and 22) of the plate 21 forming the swinging link. The nozzle unit 20 preferably has curved upper and lower walls, as shown, to provide a smoothly curved boundary wall on the inside of the bend when the jet is deflected in either direction.

Figure 2:
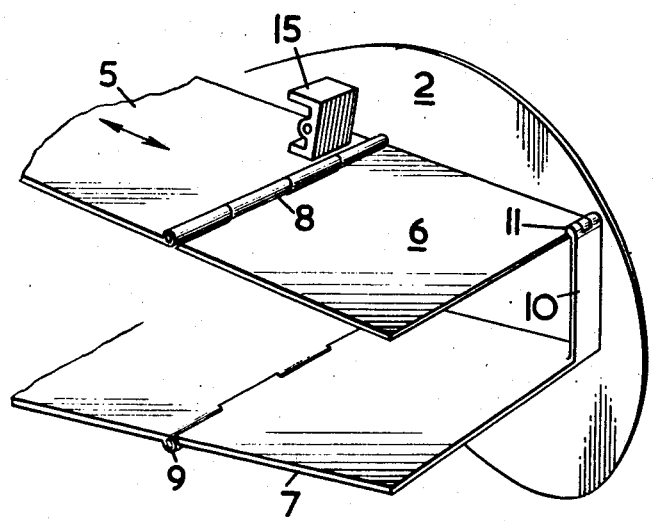
Figure 2 is an isometric view of part of the nozzle.

In all forms of the invention the side plates 2 of the jet pipe extend rearwardly of the top and bottom walls 3 and 4 to form the side walls of the nozzle in Figures 1 and 2 or walls partly overlapping the nozzle unit of the modification. The various moving members slide between these side walls 2 with sealing engagement.

I claim:

1. A jet-pipe and jet-deflecting nozzle device for a jet-propelled aircraft comprising in combination a top jet-pipe wall, a lower jet-pipe wall and two side plates together constituting the jet-pipe, a first nozzle wall, means connecting said first nozzle wall to the rear end of one of said jet-pipe walls, which connecting means incorporate a hinge, a slider movable forwardly and rearwardly along the opposite one of said jet-pipe walls, an opposite nozzle wall, means connecting said opposite nozzle wall to said slider, which connecting means incorporate a hinge, and further connecting means linking together said two nozzle walls and constraining them to make corresponding angular movements.

2. A jet-pipe and nozzle device according to claim 1 wherein the said nozzle walls are curved to form a convergent nozzle.

3. A jet-pipe and jet-deflecting nozzle device for a jet-propelled aircraft comprising in combination a top jet-pipe wall, a lower jet-pipe wall, and two side plates together constituting the jet-pipe, a nozzle wall directly hinged to one of said jet-pipe walls along the rear edge of the jet-pipe wall, a slider movable forwardly and rearwardly along the opposite one of said jet-pipe walls, an opposite nozzle wall directly hinged to said slider along the rear edge of the slider and at least one link between the said nozzle walls, hinged to one of them in the neighborhood of their rear ends.

4. A jet-pipe and jet-deflecting nozzle device for a jet-propelled aircraft comprising in combination a top jet-pipe wall, a lower jet-pipe wall and two side plates together constituting the jet-pipe, an upper nozzle wall, a lower nozzle wall, connecting means between the rear end of one of said jet-pipe walls and the forward end of the adjacent one of said nozzle walls, a slider movable forwardly and rearwardly along the opposite one of said jet-pipe walls, an opposite nozzle wall, connecting means between the latter and said slider, both said connecting means each incorporating a hinge, and at least one of them being constituted by a swinging link hinged to the two parts which it connects, and further connecting means linking together said two nozzle walls and constraining them to make corresponding angular movements.

5. A jet-pipe and jet-deflecting nozzle device for a jet-propelled aircraft, comprising in combination a top jet-pipe wall, a lower jet-pipe wall and two side plates together constituting the jet-pipe, a nozzle unit constituted by a top wall, a lower wall and side plates together forming a box, connecting means between the rear end of one of said jet-pipe walls and the forward end of the adjacent one of said nozzle walls, a slider movable forwardly and rearwardly along the opposite one of said jet-pipe walls, and further connecting means between the slider and the other of said nozzle walls, both said connecting means incorporating hinges and one of them being constituted by a swinging link hinged to the two parts which it connects.

6. A jet-pipe and jet-deflecting nozzle device according to claim 5 wherein said swinging link is hinged at one end to the said slider and at the other end to one of said nozzle walls.

References Cited in the file of this patent
UNITED STATES PATENTS

| | | |
|---|---|---|
| 2,420,323 | Meyer et al. | May 13, 1947 |
| 2,475,786 | Jordan | July 12, 1949 |
| 2,488,174 | Clegern | Nov. 15, 1949 |
| 2,526,510 | Smith | Oct. 17, 1950 |
| 2,537,487 | Stone | Jan. 9, 1951 |